United States Patent
Hyndman

(10) Patent No.: US 8,232,989 B2
(45) Date of Patent: Jul. 31, 2012

(54) METHOD AND APPARATUS FOR ENHANCING CONTROL OF AN AVATAR IN A THREE DIMENSIONAL COMPUTER-GENERATED VIRTUAL ENVIRONMENT

(75) Inventor: Arn Hyndman, Ottawa (CA)

(73) Assignee: Avaya Inc., Basking Ridge, NJ (US)

( * ) Notice: Subject to any disclaimer, the term of this patent is extended or adjusted under 35 U.S.C. 154(b) by 579 days.

(21) Appl. No.: 12/344,531

(22) Filed: Dec. 28, 2008

(65) Prior Publication Data

US 2010/0164946 A1 Jul. 1, 2010

(51) Int. Cl.
*G06T 15/00* (2006.01)
*G09G 5/00* (2006.01)

(52) U.S. Cl. .......................... 345/419; 345/653; 345/664

(58) Field of Classification Search .................. 345/427, 345/419

See application file for complete search history.

(56) References Cited

U.S. PATENT DOCUMENTS

| | | | | |
|---|---|---|---|---|
| 7,468,728 B2* | 12/2008 | Watt | ............................... | 345/473 |
| 7,478,047 B2* | 1/2009 | Loyall et al. | .................. | 704/258 |
| 2004/0075677 A1 | 4/2004 | Loyall et al. | | |
| 2006/0087510 A1* | 4/2006 | Adamo-Villani et al. | .... | 345/474 |
| 2006/0247046 A1* | 11/2006 | Choi et al. | ....................... | 463/36 |
| 2008/0158232 A1* | 7/2008 | Shuster | .......................... | 345/474 |
| 2009/0031240 A1* | 1/2009 | Hildreth | ......................... | 715/772 |
| 2009/0147008 A1* | 6/2009 | Do et al. | ........................ | 345/473 |

FOREIGN PATENT DOCUMENTS

| | | |
|---|---|---|
| CA | 2659672 | 1/2008 |
| GB | 2351426 | 12/2000 |

OTHER PUBLICATIONS

Written Opinion of the International Searching Authority from corresponding PCT application PCT/CA2009/001710.

* cited by examiner

*Primary Examiner* — Hau Nguyen
*Assistant Examiner* — Leon T Cain, II
(74) *Attorney, Agent, or Firm* — Anderson Gorati & Manaras LLP

(57) ABSTRACT

A method and apparatus for enhancing control of an Avatar in a three dimensional computer-generated virtual environment is provided. In one embodiment, a user can control one or more controllable aspects of an Avatar directly via interacting with a touch sensitive user input device such as a touchpad or touch sensitive screen. Interaction with the touch sensitive user input device enables more precise control and more direct control to be implemented over the action of the Avatar in the virtual environment. Multiple aspects of the Avatar may be controlled, such as the Avatar's forward motion, orientation, arm movements, and grasping of objects.

13 Claims, 6 Drawing Sheets

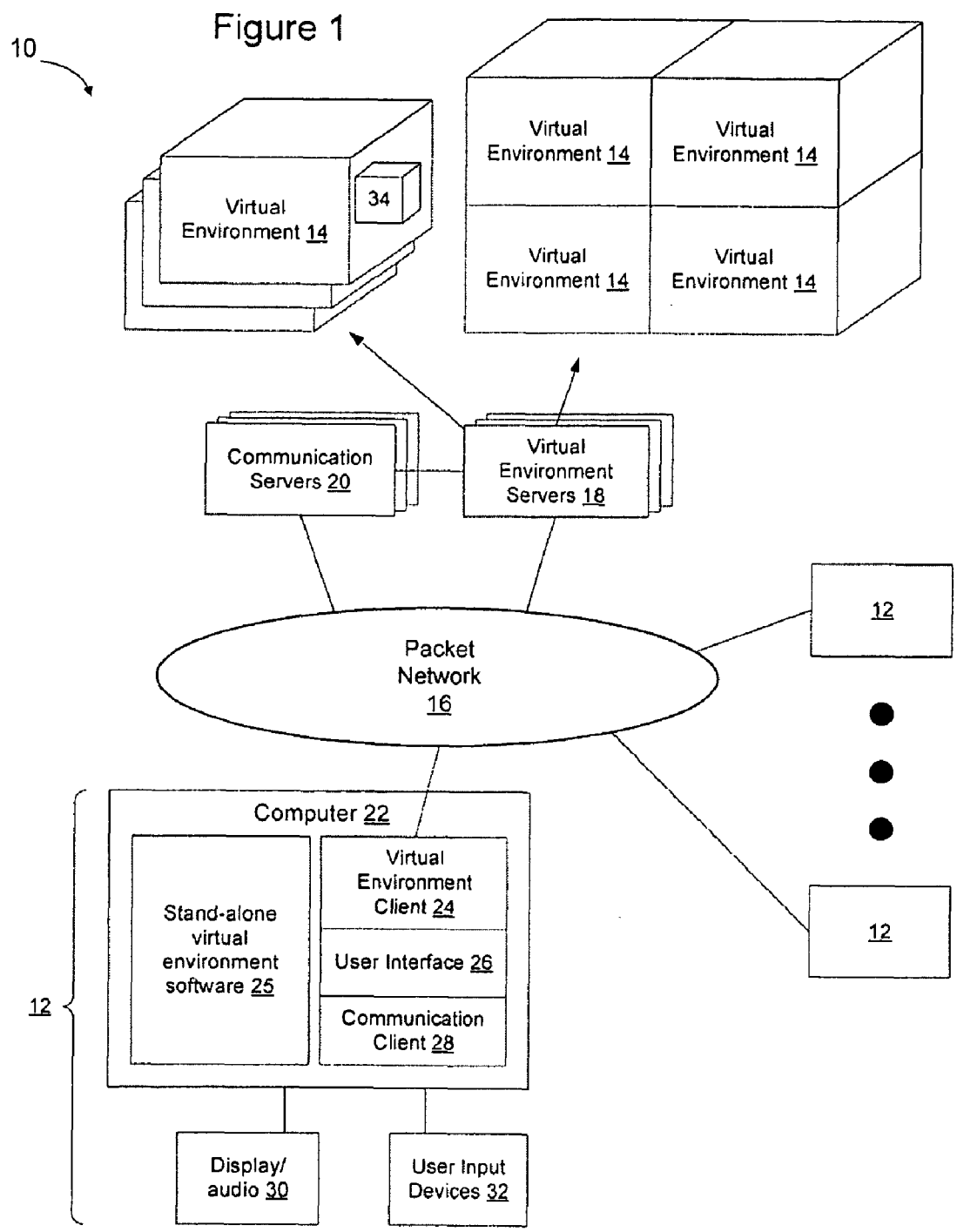

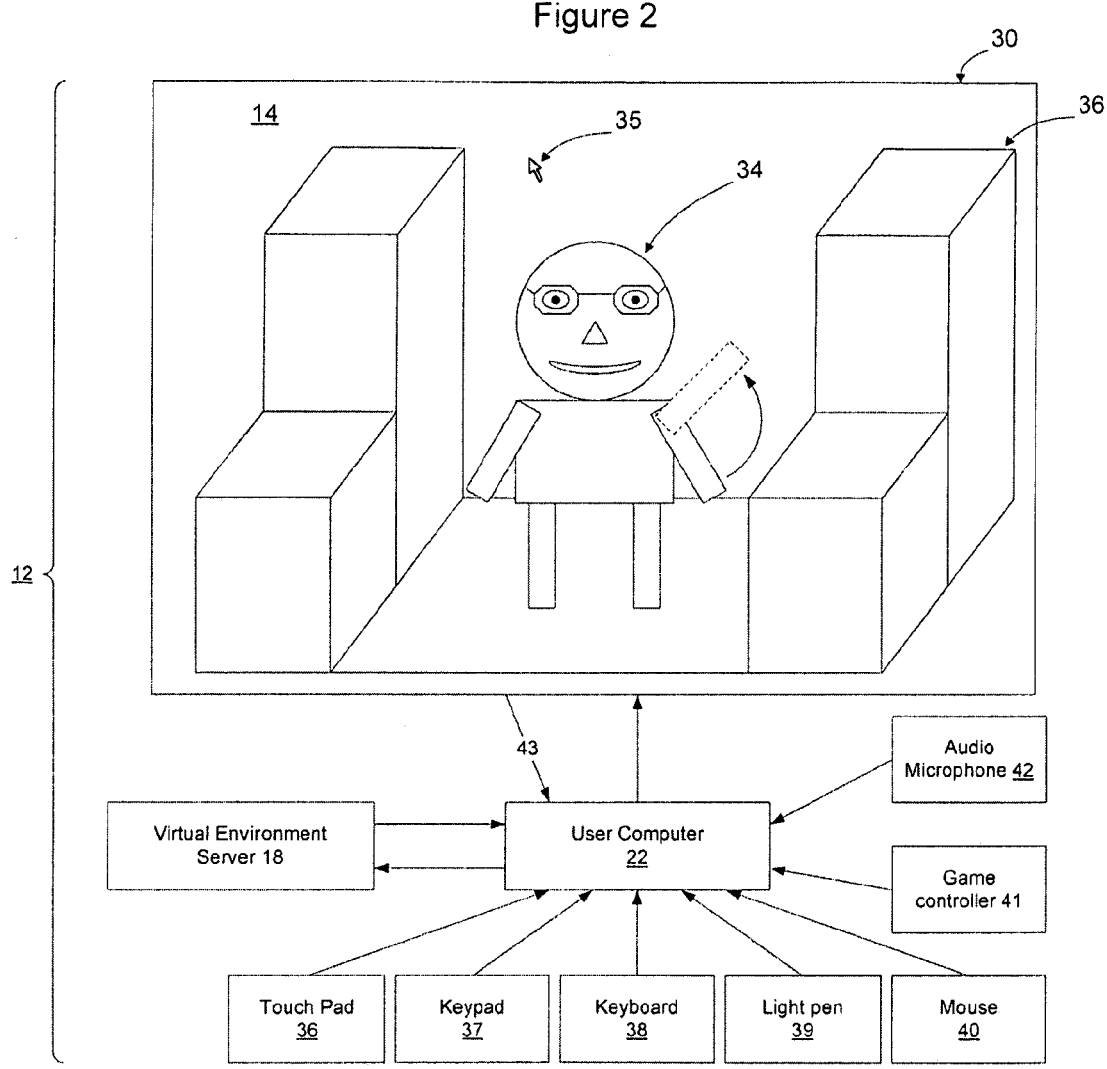

Fig. 3A — Walk straight
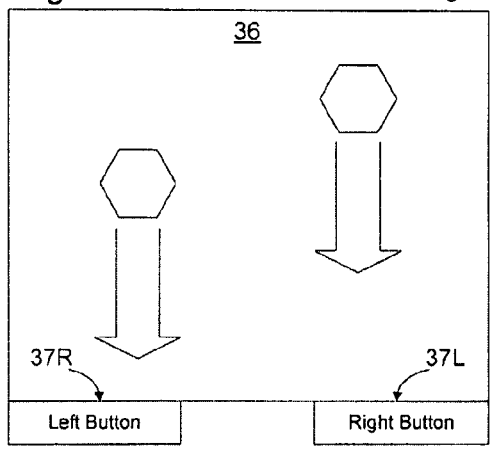
Fig. 3B — Run
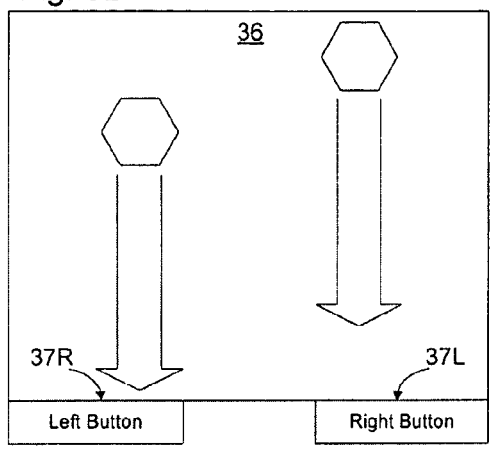
Fig. 3C — Turn toward right
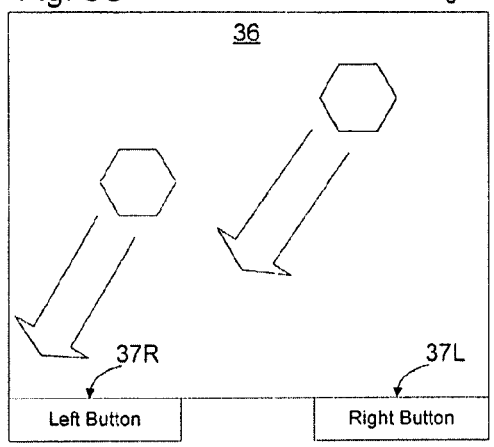
Fig. 3D — Turn hard to right
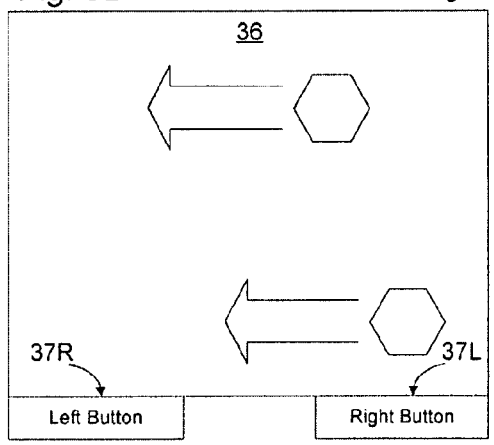
Fig. 3E — Turn toward left
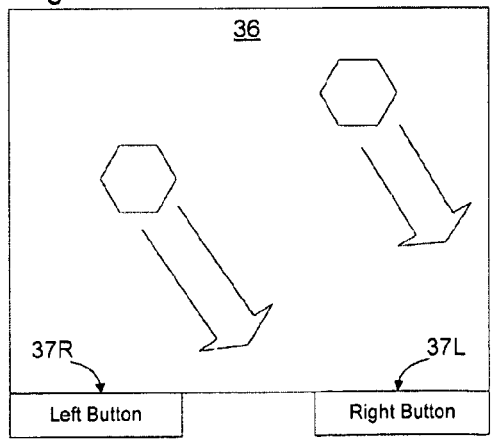
Fig. 3F — Turn hard to left
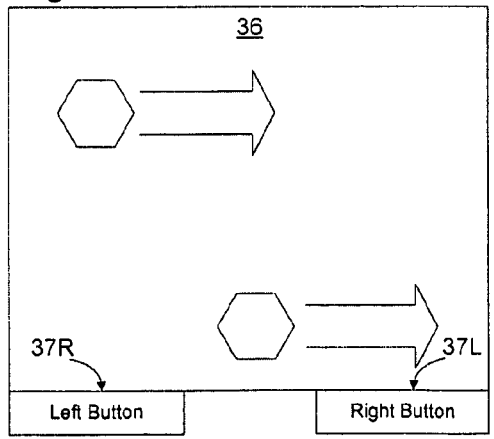

Fig. 3G — Slide
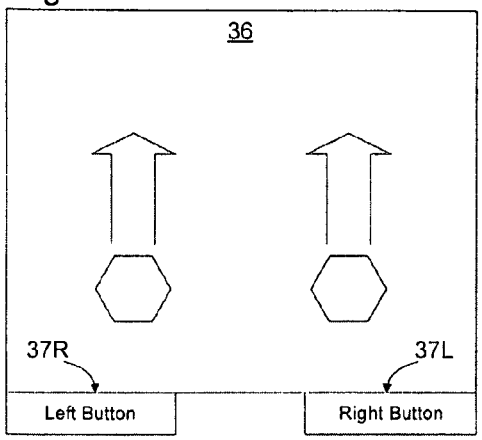
Fig. 3H — Slow down or stop
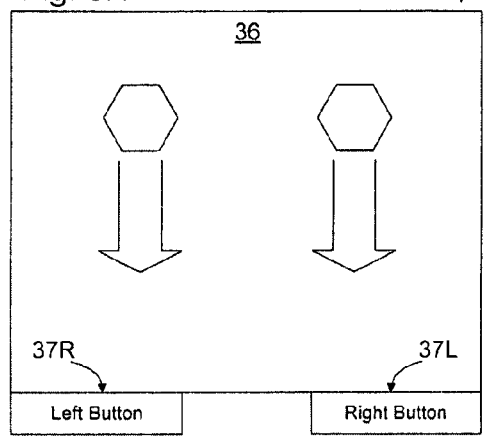
Fig. 3I — Turn around toward right
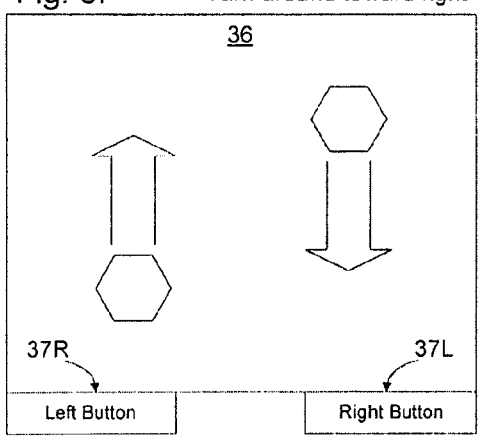
Fig. 3J — Turn around toward left
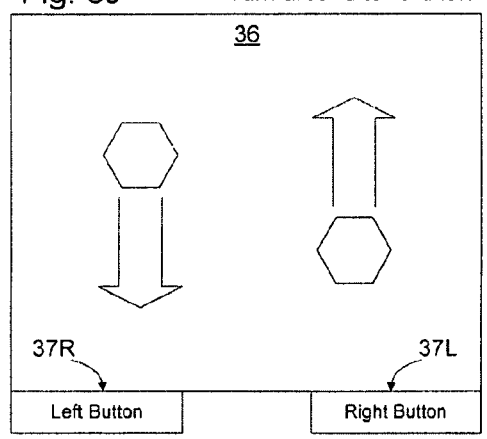
Fig. 3K — Jump
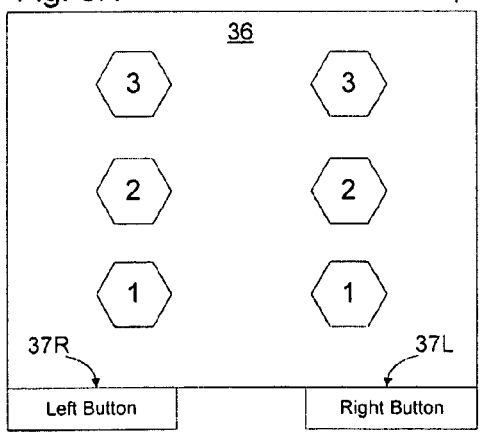
Fig. 3L — Skip
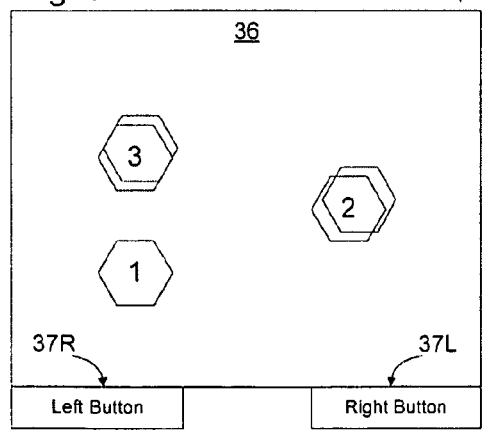

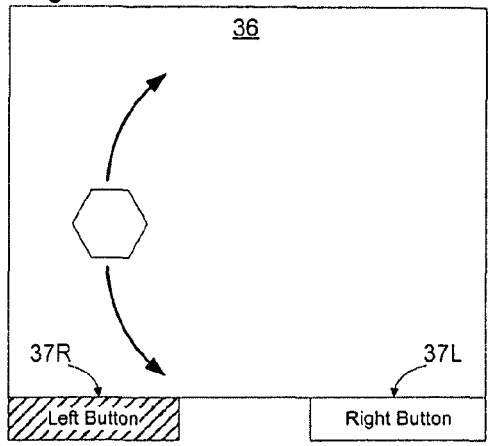
Fig. 3M — Wave left hand
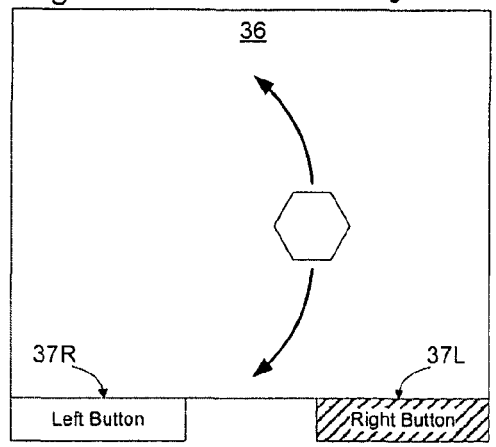
Fig. 3N — Wave right hand
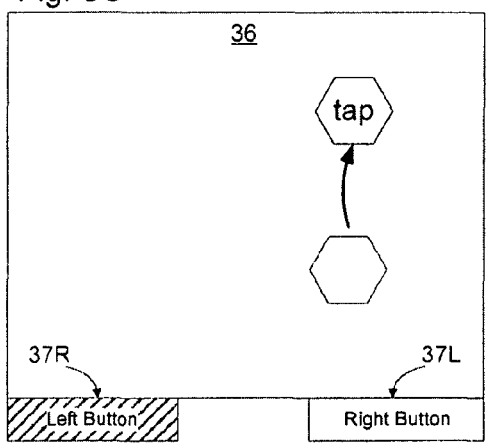
Fig. 3O — Grab
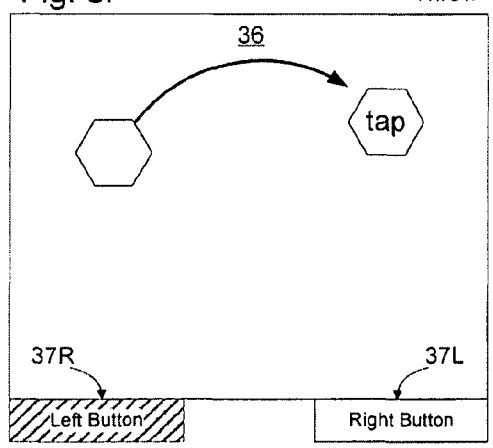
Fig. 3P — Throw
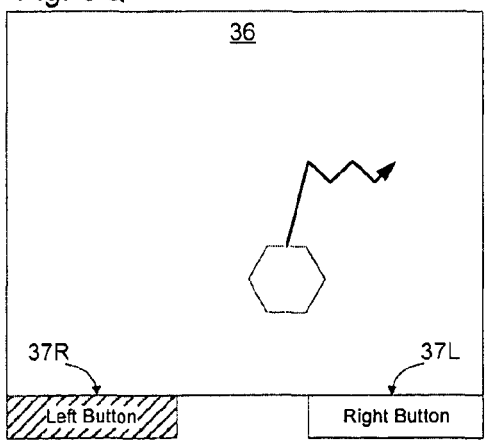
Fig. 3Q — Shake hands
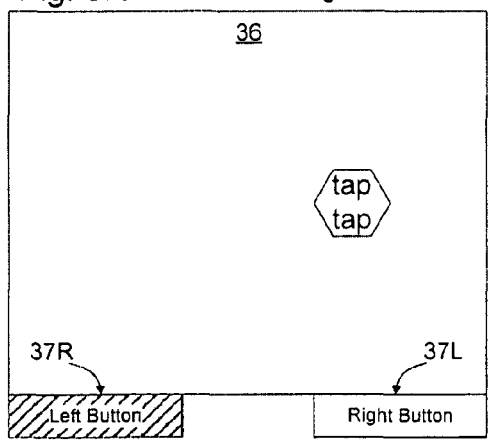
Fig. 3R — Extend arm straight out to front

METHOD AND APPARATUS FOR ENHANCING CONTROL OF AN AVATAR IN A THREE DIMENSIONAL COMPUTER-GENERATED VIRTUAL ENVIRONMENT

CROSS-REFERENCE TO RELATED APPLICATIONS

None

BACKGROUND OF THE INVENTION

1. Field of the Invention

The present invention relates to virtual environments and, more particularly, to a method and apparatus for enhancing control of an Avatar in a three dimensional computer-generated virtual environment.

2. Description of the Related Art

Virtual environments simulate actual or fantasy 3-D environments and allow for many participants to interact with each other and with constructs in the environment via remotely-located clients. One context in which a virtual environment may be used is in connection with gaming, although other uses for virtual environments are also being developed.

In a virtual environment, an actual or fantasy universe is simulated within a computer processor/memory. A virtual environment may be implemented as a stand-alone application, such as a computer aided design package or a computer game. Alternatively, the virtual environment may be implemented on-line so that multiple people may participate in the virtual environment through a computer network, such as a local area network or a wide area network such as the Internet. Users are represented in a virtual environment by an "Avatar" which is often a three-dimensional representation of a person or other object to represent them in the virtual environment. Participants interact with the virtual environment software to control how their Avatars move within the virtual environment. The participant may control the Avatar using conventional input devices, such as a computer mouse and keyboard or optionally may use more specialized controls such as a gaming controller.

As the Avatar moves within the virtual environment, the view experienced by the Avatar changes according to where the Avatar is located within the virtual environment. The views may be displayed to the participant so that the participant controlling the Avatar may see what the Avatar is seeing. Additionally, many virtual environments enable the participant to toggle to a different point of view, such as from a vantage point outside (i.e. behind) the Avatar, to see where the Avatar is in the virtual environment. An Avatar may be allowed to walk, run, swim, and make other gross motor movements within the virtual environment. The Avatar may also be able to perform fine motor skills such as be allowed to pick up an object, throw an object, use a key to open a door, and perform other similar tasks.

Virtual environments are commonly used in on-line and stand-alone gaming, such as for example in role playing games where a user assumes the role of a character and takes control over most of that character's actions. In addition to games, virtual environments are also being used to simulate real life environments to provide an interface for users that will enable on-line education, training, shopping, and other types of interactions between groups of users and between businesses and users.

Animation of the Avatar's movements involves three dimensional computer animation. To animate an Avatar, a stick-figure or skeleton representation will be used. Each segment of the skeletal model is defined by an animation variable, which is commonly referred to as an Avar. The collection of Avars defines the Avatar's skeleton and, hence, define how parts of the Avatar's model can move. The skeletal model also restricts movement of the Avatar to prevent the Avatar from assuming unrealistic positions or engaging in unrealistic motion. The skeletal model itself is invisible and not rendered. Rather, the position of the Avars defines the position and orientation of the Avatar within the virtual environment. To get a three dimensional representation of the Avatar, a skin is defined around the skeletal model. Although the use of skeletal animation is commonly used, other ways of animating exist as well.

To enable the Avatar to move within the three dimensional virtual environment, the animator will manipulate the Avars directly. Movement of the Avars causes movement of the Avatar which, when wrapped with the skin, causes the three dimensional model of the Avatar to appear to move.

Movement of an object is actually a series of frames that shows the object in slightly different positions. By showing the frames sufficiently rapidly, such as at 30 or 60 frames per second, the object may appear to move in a continuous manner. Movement of an Avatar is accomplished in this same way. However, rather than defining the position of every Avar for every frame, key positions of the Avars will be defined at strategic points in the animation sequence (referred to as keyframes) and the computer will interpolate between the key positions to determine the precise position of the Avars at every frame. The process of interpolating between keyframes is commonly referred to as "Tweening", which refers to the computer determining the position in between keyframes.

When a user controls an Avatar in a virtual environment, the user activates sequences of Avar movements, which causes the Avatar to move through specified sequences of keyframes. The Avatar will appear to execute the desired motion as the computer moves the Avatar through the predefined sequence of keyframes. Thus, although the user may direct the Avatar's actions within the virtual environment, the user does not actually control the Avatar's movements. Rather, the user selects a particular animation sequence which will enable the user to make a particular movement. The movement itself, however, is defined by the keyframes associated with the animation sequence and, hence, the actual movement of the Avatar is controlled by the virtual environment program.

For example, assume that the virtual environment is set up so that the mouse controls where the Avatar walks in the virtual environment. When the user places their mouse cursor over a particular area, the Avatar will walk toward the area. Then user is thus "directing" the Avatar's action within the virtual environment since they control where the Avatar walks within the virtual environment. However, the user is not controlling the Avatar's actions, since the user is not actually controlling how the Avatar moves their legs, feet, etc. When the user directs the Avatar to take a step, the virtual environment client will cause the Avars of the Avatar to move through a sequence that will cause the skeleton and, hence the Avatar, to appear to execute a step motion. The actual step motion, i.e. the sequence of keyframes, is provided by the computer without input from the user. Thus, the actual walking motion and other actions of the Avatar are generated by the computer using particular animation sequences. Although the user provides input to tell the virtual environment what the Avatar should do, and the actual movement or action of the Avatar is implemented by the virtual environment server.

Using canned action sequences to be implemented when the user provides particular input is useful, since it makes it easier for the user to learn how to navigate within the virtual environment and makes it easier for the user to control the Avatar's gross motor actions in the virtual environment. However, since the Avatar's actions are not individually controllable by the user, the types of movement in which an Avatar may engage are limited according to selection from the available canned action sequences. As virtual environments become more sophisticated, and Avatars become more expressive, it would be advantageous to more directly control how Avatars can operate in a three dimensional computer-generated virtual environment.

SUMMARY OF THE INVENTION

A method and apparatus for enhancing control of an Avatar in a three dimensional computer-generated virtual environment is provided. In one embodiment, a user can control one or more controllable aspects of an Avatar directly via interacting with a touch sensitive user input device such as a touchpad or touch sensitive screen. Interaction with the touch sensitive user input device enables more precise control and more direct control to be implemented over the action of the Avatar in the virtual environment. Multiple aspects of the Avatar may be controlled, such as the Avatar's forward motion, orientation, arm movements, and grasping of objects.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIG. 1 is a functional block diagram of a portion of an example system enabling users to have access to three dimensional computer-generated virtual environment;

FIG. 2 is a view of an example Avatar appearing on a display as part of a three dimensional computer-generated virtual environment;

FIGS. 3A-3R are example control patterns that may be used to provided enhanced control of an Avatar in a three dimensional computer-generated virtual environment;

DETAILED DESCRIPTION

Figure 4:
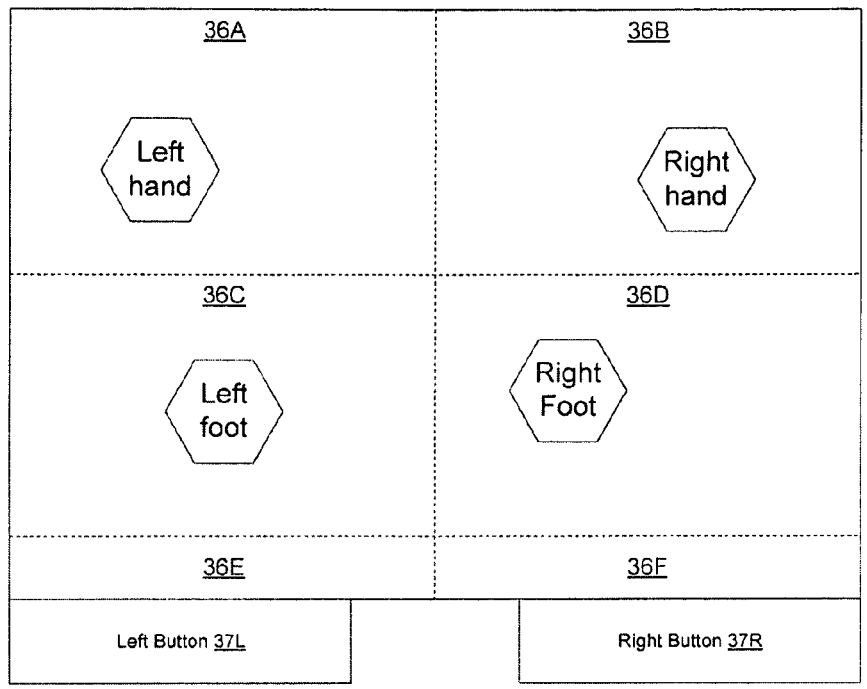
FIG. 4 is a functional block diagram of a touch pad configured to be used to control multiple aspects of an Avatar in a three dimensional computer-generated virtual environment.

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

FIG. 1 shows a portion of an example system 10 showing the interaction between a plurality of users 12 and one or more network-based virtual environments 14. A user may access the network-based virtual environment 14 from their computer 22 over a packet network 16 or other common communication infrastructure. The virtual environment 14 is implemented by one or more virtual environment servers 18. Communication sessions such as audio calls between the users 12 may be implemented by one or more communication servers 20.

A virtual environment may be implemented by stand-alone virtual environment software 25 as well, which may be is instantiated on the user's computer 22 instead of the virtual environment client to enable the computer to generate the virtual environment directly for display to the user. The computer may still connect to the network 16, but would not need to do so to generate the virtual environment and enable the user to interact with the virtual environment.

The virtual environment 14 may be any type of virtual environment, such as a virtual environment created for an on-line game, a virtual environment created to implement an on-line store, a virtual environment created to implement an on-line training facility, or for any other purpose. Virtual environments are being created for many reasons, and may be designed to enable user interaction to achieve a particular purpose. Example uses of virtual environments include gaming, business, retail, training, social networking, and many other aspects.

Generally, a virtual environment will have its own distinct three dimensional coordinate space. Avatars representing users may move within the three dimensional coordinate space and interact with objects and other Avatars within the three dimensional coordinate space. The virtual environment software maintains the virtual environment and generates a visual presentation for each user based on the location of the user's Avatar within the virtual environment. In stand-alone mode, this may be implemented by the stand-alone virtual environment software. In networked mode, this may be implemented by a combination of the virtual environment client and virtual environment server. The view may also depend on the direction in which the Avatar is facing and the selected viewing option, such as whether the user has opted to have the view appear as if the user was looking through the eyes of the Avatar, or whether the user has opted to pan back from the Avatar to see a three dimensional view of where the Avatar is located and what the Avatar is doing in the three dimensional computer-generated virtual environment.

Each user 12 has a computer 22 that may be used to access the three-dimensional computer-generated virtual environment. A user interface 26 to the virtual environment enables input from the user to control aspects of the virtual environment. The user interface 26 may be part of the virtual environment client 24, or implemented as a separate process. A separate virtual environment client may be required for each virtual environment that the user would like to access, although a particular virtual environment client may be designed to interface with multiple virtual environment servers. A communication client 28 is provided to enable the user to communicate with other users who are also participating in the three dimensional computer-generated virtual environment. The communication client may be part of the virtual environment client 24, the user interface 26, or may be a separate process running on the computer 22.

The user may see a representation of a portion of the three dimensional computer-generated virtual environment on a display/audio 30 and input commands via a user input device 32 such as a mouse and keyboard. According to an embodiment of the invention, a touch sensitive user input device such as a touchpad or touch sensitive display may also be used as an input device. The display/audio 30 may be used by the user to transmit/receive audio information while engaged in the virtual environment. For example, the display/audio 30 may be a display screen having a speaker and a microphone.

Typically, an Avatar is a three dimensional rendering of a person or other creature that represents the user in the virtual environment. The user selects the way that their Avatar looks when creating a profile for the virtual environment. This may be implemented by enabling the user to specify particular values of the Avars defining the Avatar's skeleton. Once the Avatar has been defined, the user can control the movement of the Avatar in the virtual environment such as by causing the Avatar to walk, run, wave, talk, or make other similar movements. Thus, the block 34 representing the Avatar in the virtual environment 14, is not intended to show how an Avatar would be expected to appear in a virtual environment. Rather, the actual appearance of the Avatar is immaterial since the actual appearance of each user's Avatar may be expected to be somewhat different and customized according to the preferences of that user.

FIG. 2 shows the display in greater detail. As shown in FIG. 2, the user display 30 will generally include a three dimensional computer-generated virtual environment 10 within which the user's Avatar 34 may move and interact with objects and other Avatars. A simplified Avatar 34 has been shown in this figure for simplicity of illustration. Actual Avatars are generally three dimensional representations of humans or other creatures rather than simple line drawings.

The user may use control devices such as a computer keyboard and mouse to control the Avatar's motions within the virtual environment. Commonly, keys on the keyboard may be used to control the Avatar's movements and the mouse may be used to control the direction of motion. One common set of letters that is frequently used to control an Avatar are the letters WASD, although other keys also generally are assigned particular tasks. The user may hold the W key, for example, to cause their Avatar to walk and use the mouse to control the direction in which the Avatar is walking. Numerous other input devices have been developed, such as touch sensitive screens, dedicated game controllers, joy sticks, etc. Many different ways of controlling gaming environments and other types of virtual environments have been developed over time. In the illustrated embodiment, the user may have many input devices, including a keypad 37, keyboard 38, light pen 39, mouse 40, game controller 41, audio microphone 42, and other types of input devices. According to an embodiment of the invention, the user may also use one or more touch sensitive user input devices to control particular actions of the Avatar within the virtual environment.

When the user enters commands to cause the Avatar to move, the virtual environment software will cause the Avatar to move through a predefined sequence. As noted above, an Avatar is generally defined by Avars that describe the Avatar's skeleton. Skeletal animation also specifies limitations on how the Avatar may move so that the Avatar does not move unrealistically. A particular sequence will cause animation by causing the Avars to move through a pre-set series of keyframes. The computer will interpolate between the keyframes to cause the Avatar to appear to move smoothly to execute the desired motion. Multiple motions may be accommodated by executing several sequences at once. This is commonly referred to as animation blending. For example, an Avatar may be caused to raise its arm while walking.

According to an embodiment of the invention, a touch sensitive user input device such as a touch pad 36 or touch sensitive display screen may be used to provide enhanced control over the user's Avatar. For example, the display 30 may be touch sensitive such that touching the screen may be used to control particular aspects of the virtual environment. Optionally, a multi-touch touchpad may be used to control the Avatar. The touchpad 36 may be used alone or in combination with other inputs, such as a keypad 37, keyboard 38, light pen 39, mouse 40, game controller 41, audio microphone 42, or other available input device.

FIGS. 3A-3R show several combinations of motions on a touch sensitive surface such as a touchpad or touch screen that may be used to provide enhanced control of an Avatar in a three dimensional computer-generated virtual environment. The control inputs are used to directly control the motion of the Avatar, such as the placement of the Avatar's feet, the quickness of the steps that the Avatar is taking in the virtual environment, the location of the Avatar's hand, the angle, direction, and speed with which the Avatar moves his arm, and other similar aspects of the Avatar's motion. Although some of the motions may call upon the virtual environment server to execute canned motion sequences, the way in which the user instructs the virtual environment server provides more control over the precise execution of the canned motion sequence to thereby enhance control over the Avatar's motions. For example, if the user directs the Avatar to raise its arm 20 degrees, the actual rendering of the motion within the virtual environment may be taken from a canned execution sequence. However, the extent of execution of the sequence may be controlled by the user's input to simulate more direct control over the precise motion of the Avatar.

For example, where a particular motion is defined as a set of keyframes that are executed in a sequence, the user may use the touch pad to specify particular keyframes along the sequence so that the Avatar will move to the specified keyframe rather than all the way through the animation sequence. The virtual environment software will progress through the sequence of keyframes, tweening to fill in the fluid animation between keyframes, until it reaches the user-selected keyframe. The user may move their fingertip in one direction on the touchpad to cause the animation sequence to move forward to subsequent keyframes or, alternatively, may move their fingertip in the opposite direction on the touchpad to cause the animation sequence to move in the opposite direction to move backward toward previous keyframes.

Another way that the user input may be translated to Avatar motion is to enable the user to control an Avar directly, so that the user can manipulate the Avar through a plane of motion in two or three dimensions. This enables the user to control, for example, the position and orientation of the Avar, so that the user may cause the Avatar to move without requiring the Avatar to move through a predefined sequence of keyframes. As the Avar is moved under the control of the user, the computer will cause the other Avars affected by movement of the controlled Avar to also move accordingly. The Avatar will then be rendered as defined by the motion of the Avars.

Where animation blending is used, the user may simultaneously control two or more sequences. Thus for example where the user is controlling the user's arm, the user may move their fingertip up/down on the touchpad to control how far up/down the Avatar raises its arm. The user may also move their finger left/right on the touchpad to control the direction the Avatar points its arm. This may be useful, for example, to enable more precise control over the Avatar. For example, where the Avatar is holding a virtual sword, this may enable the user to directly control the Avatar in a sword fight rather than simply instructing the Avatar to make a downward slashing motion that would then be executed by the Avatar.

The enhanced control enables particular actions to be taken and controlled by the person using a straight-forward easy to remember set of controls. Rather than requiring the user to remember particular keystrokes to get their Avatar to perform a particular movement, such as using a combination of keyboard keys, multiple types of movements may be executed simply by touching the touch sensitive surface. This simplifies the user interface for the virtual environment, making it more intuitive and, hence, easier to use than user interfaces requiring memorization of particular keyboard keystrokes and combinations of keystrokes.

Direct control over a particular feature of Avatar animation may be implemented using the touch sensitive user input device at the same time that conventional Avatar controls are used to control other actions of the Avatar in the virtual environment. For example, keys on the keyboard may be used to control the Avatar to cause the Avatar to walk within the virtual environment. At the same time, the touch sensitive user input device may be used to control the Avatar's arm to cause the Avatar to raise its arm and wave to hail another Avatar. Thus, the touch sensitive user input device may be used in connection with other types of user input devices to control particular features of the Avatar.

FIGS. 3A-3R show several sequences that may be used to control an Avatar via a touch-sensitive surface such as a touchpad or touch screen. Other touch sensitive surfaces may be used as well. For example, touch sensitive display screens are commonly available on personal data assistants and other handheld electronic devices, and are becoming available on laptop and desktop computers. The several touch sequences shown in the Figs. are only intended to be examples. In the figures, a hexagon represents an initial touch of the touch sensitive surface, and arrows are used to show contact motion of the user's fingertip with the touch sensitive surface. Wide arrows are used to show fingertip motion that is intended to control an Avatar's leg/foot, and narrow arrows are used to show fingertip motion that is intended to control an Avatar's arm/hand. Although a touch-pad is shown in FIGS. 3A-3R, the motion combinations may be used on other touch-sensitive surfaces as well.

FIG. 3A shows a way that the touchpad may be used to enable the user to control their Avatar to cause their Avatar to walk forward in the three dimensional computer-generated virtual environment. In FIG. 3A, the user's finger tip contacting the pad is represented by the hexagon, and the motion of the user's finger on the touchpad is represented by the arrow. As shown in FIG. 3, the user may make their fingers do a walking motion by causing their fingers to serially contact the touchpad and pull down over the surface of the touchpad. Where the person uses two fingers one after another, such as their index and middle fingers, the computer may interpret the left fingertip contact as representing the Avatar's left foot and the right fingertip contact as representing the Avatar's right foot.

FIG. 3B shows a similar set of motions that may be used to cause the Avatar to run in the virtual environment. As shown in FIG. 3, the motion used to make the Avatar run in the virtual environment may be similar to the motion used to make the Avatar walk, except that the motion may be increased in some way to signal to the computer that the Avatar's motion should be more dramatic. For example, the length of the stroke on the touchpad may be increased by the user, the frequency with which the user strokes the pad may be increased, or both length and frequency may be increased.

FIGS. 3C-3D show how the Avatar may be controlled to turn toward the right in the three dimensional computer-generated virtual environment, and FIGS. 3E-3F show how the Avatar may be controlled to turn toward the left in the three dimensional computer-generated virtual environment. As shown in these figures, the direction of the stroke of the user's fingertip on the touch-sensitive surface may be used to control the direction of movement of a portion of the Avatar within the virtual environment. Thus, as shown in FIG. 3C, if the user causes the finger strokes to move from the top of the touchpad toward the lower left corner, the Avatar will turn to the right. This is a natural motion for the user because, if the user is making his fingers do a "walking" motion, then turning the user's hand to point toward the right will cause the direction in which the fingers slide on the touchpad to approximate those shown in FIG. 3C. As shown in FIG. 3D, the farther the user turns the walking motion the harder the Avatar will turn in the virtual environment. The same control may be used in the opposite direction, as shown in FIGS. 3E-3F, to cause the Avatar to walk/run toward the left.

FIGS. 3G-3L show several other finger sequences that may be used to enable the Avatar to perform motions other than walking/running. For example, FIG. 3G shows an example finger motion that may be used by the user to cause the Avatar to slide in the virtual environment. Assume that the Avatar has been running, and is on a slippery surface. By causing both fingers to simultaneously contact the touchpad and slide them forward, the user may cause the Avatar to execute a sliding motion to skim across the slippery surface. This may cause the Avatar to slide to a stop or simply to slide for a while on the surface.

In the example shown in FIG. 3H, the user would like to cause the Avatar to slow down or stop. In this instance, the user may touch both fingertips to the touchpad and slide the fingers slowly toward the bottom of the touchpad. Executing a motion of this nature may cause the Avatar to slow its rate of travel within the virtual environment.

In other instances, the Avatar may be stationary and want to turn around. FIGS. 3I and 3J show several examples of how the user may control the Avatar to cause the Avatar to turn around in the virtual environment. In the Example shown in FIG. 3I, the user will cause their fingertips to contact the touchpad and slide their fingertips in opposite directions. In the example shown in FIG. 3I, this motion will cause the Avatar's left foot to move up and right foot to move down to thereby cause the Avatar to turn around toward the right. The converse motion is shown in FIG. 3J which will cause the Avatar to turn toward the left.

FIGS. 3K and 3L show several additional combinations that may enable the user to cause the Avatar to execute more unusual motions. For example, if the user taps both fingertips on the touchpad in a hopping motion, the user may cause the Avatar to jump in the virtual environment. Similarly, if the user alternates double taps of his fingers on the touchpad, the user may cause the Avatar's left foot to hop, right foot to hop, left foot to hop, etc., to cause the Avatar to skip in the virtual environment.

Although several foot sequences have been described in connection with several corresponding finger contact and stroke motions on the touchpad, the invention is not limited to these several examples as many different types of motions may be developed over time as experience is gained with this type of user interface. Accordingly, other types of finger strokes may be developed to implement one or more of these types of Avatar movements, and other finger tap/stroke combinations may be developed to control more advanced Avatar movements.

As shown in FIG. 4, the touchpad may be divided into areas 36A-36E, particularly if the touchpad is sufficiently large. The different areas may be used for different purposes, such as to control different aspects of the Avatar. For example, a touchpad may be divided into quadrants 36A-36D, in which each quadrant controls a different limb of the Avatar. Additionally, particular portions 36E, 36F of the touchpad may be designated as buttons such that a tap or other touch in that designated area would be deemed to be a button push rather than as controlling an aspect of Avatar movement. Other ways of using touch sensitive user input devices may be used as well.

FIGS. 3M-3R show several finger motions that may be used to control the Avatar's other limbs, such as the Avatar's arms and hands. Since the touchpad is not able to discern a touch associated with an arm from a touch associated with a foot, in one embodiment a modifier key such as a button adjacent the touch pad may be depressed to enable the computer to differentiate a touch/stroke sequence associated with an arm movement from a touch/stroke sequence associated with a foot. Thin arrows have been used to show motion of finger strokes that cause arm/hand motion.

In the examples shown in FIGS. 3M and 3N, it has been assumed that there are two buttons associated with the touch pad 36—a left button 37L and a right button 37R. If one button is pressed, the user may use one finger to control one arm. If both buttons are pushed, the user may use two fingers to contact the touchpad to control the movement of both arms.

In the example shown in FIGS. 3M and 3N, depressing the left button 37L will cause the computer to allow the user to control the user's left arm, and depressing the right button 37R will cause the computer to allow the user to control the user's right arm. This is intuitive since, in this embodiment, the button that is depressed causes any movement on the pad to be associated with the corresponding arm. Alternatively, this may be reversed depending on the preference of the user. For example, the user may want to control the Avatar's right arm with their right hand, and hold the touchpad button with their left hand. Since the left button is closer to the person's left hand, for particular users it may be more convenient to have the left touchpad button 37L be used to designate the Avatar's right hand and vice versa. In FIGS. 3M and 3N two arrows have been showing, illustrating that the user may move their fingertip up and down sequentially to cause the Avatar to raise and lower its arm in an up/down motion.

It is sometimes desirable to cause an Avatar to grasp an object in the three dimensional computer-generated virtual environment. FIGS. 3O and 3P show two examples of touch/stroke combinations that may be used to enable a user to control their Avatar to cause the Avatar to grasp an item, ungrasp the item, and optionally throw the item. As shown in FIG. 3O, if a person would like to grasp an item, the user may touch the touchpad while holding down one of the arm selection buttons and move their fingertip to cause the Avatar to raise its arm toward the item to be grasped. If there is an object in the vicinity that is graspable by the Avatar, optionally the arm may be automatically moved in that direction to make manipulation of the grasping motion easier for the user. When the user has positioned the Avatar's hand over the item to be grasped, the user may quickly tap the keypad to control the Avatar to cause the Avatar to grasp the item.

To release an item, the user may tap the keypad a second time, or optionally quickly tap the keypad several times in succession. Alternatively, the user may make a downward motion with the Avatar's arm and tap the keyboard in a motion approximately inverse to the grasping motion shown in FIG. 3O.

The motion associated with letting go of an item may be to simply place the item on the virtual ground, table, or other surface rendered in the virtual environment. Alternatively, as shown in FIG. 3P, the Avatar may be allowed to throw the item by causing the Avatar's arm to make a fast throwing motion and then tapping the touchpad to signal the release of the item. Optionally, the trajectory of the item within the virtual environment may be influenced by the direction of the stroke, the speed of the stroke, and the point where the user taps the touch sensitive surface.

There are other instances where particular motions of the Avatar's arm may be warranted. For example, in a social context it may be desirable for the Avatar to shake hands with another Avatar. This may be implemented, for example, as shown in FIG. 3Q by causing the Avatar to extend his arm (using the double tap motion described in connection with FIG. 3R) and then rapidly move his arm up and down as shown in FIG. 3Q. The user may signal this motion by depressing the arm selection button, moving their finger in an upward motion on the touchpad, and then quickly moving their finger up and down a very short distance to signal the handshake motion.

There are other instances where it may be desirable for an Avatar to extend his arm straight in front of him, for example to point. This may be signaled using a particular keystroke, such as a double tap unaccompanied by a sliding motion. Other combinations of taps and stroking motions may be used to implement the described gestures and to implement other gestures, and the invention is not limited to these particular sets of motions and gestures. Note, in this regard, that the double tap motion was also described above as a possible motion sequence that may cause an Avatar to ungrasp a grasped item. The virtual environment server may view the touch sequence in context to enable the same or similar touch/stroke combinations to be viewed in context and to enable the same/similar touch/stroke combinations to be used to control unrelated aspects of the Avatar's movement. For example, the shake hands motion of FIG. 3Q may cause the Avatar to shake hands with another Avatar if the other Avatar is sufficiently close by. The same motion may be used to make an Avatar grasp an eraser and erase a virtual white board if the Avatar is standing next to the white board. Accordingly, the particular motion performed by the Avatar may be dependent on the surrounding objects within the virtual environment and interpreted by the virtual environment server in the context of these other objects and the Avatar's position within the virtual environment.

The keyboard may also be used in connection with the touch sensitive user input device to enable enhanced control over which limb or other feature of the Avatar is controlled by the touch sensitive user input device. For example, the user may depress a button 37L to activate the touch pad and then press a button on the keyboard. For example, the H key may be used to designate the touch pad to control the Avatar's Head. When the user lets go of the button 37L, the touch pad may be used to control the Avatar's Head. The keyboard may be used in numerous other ways to specify which feature or features of the Avatar's body should be controlled by the keypad.

FIG. 4 shows an example multi-touch touchpad that may enable the user to have four or more touch points active at one time. In the embodiment shown in FIG. 4, the same motions described above in connection with FIGS. 3A-3R may be used to control hand and foot movement of the Avatar. However, since there are multiple touchpoints, the computer will need to know how to interpret the various inputs.

There are several ways that this may occur. For example, a user may depress a touchpad button whenever a limb such as an arm is to be controlled. In this embodiment, the user would signal to the computer by pressing down one of the buttons that the next tap on the touchpad will be used to control an arm. The computer would then wait for the next touch and associate that area of the touchpad with the arm control. The computer could then keep track of where the arm control touchpoint was last located and use this to associate motions in that general area with control of the arm.

For example, in FIG. 4 the user has four touchpoints on the touchpad. The user will identify a particular touch point with the Avatar's left arm, another touchpoint with the Avatar's right arm, and other touch points with the Avatar's feet. These touch points may be designated as described above, by depressing a button, or may be identified by initially touching particular areas of the touchpad. For example, when the user initially touches the touchpad, the top left touchpoint may be interpreted as controlling the Avatar's left hand, the top right touchpoint may be interpreted as controlling the Avatar's right hand, and the lower touch points may be interpreted as controlling the Avatar's feet. Many different ways of associating a touchpoint with a controllable feature of the Avatar may be available. The touch pad may also be divided into quadrants with each quadrant used to control a particular feature.

Once a touchpoint has been associated with a controllable feature of the Avatar, the computer will keep track of that touchpoint and look for future instructions from the user by looking for subsequent contact within the same general area of the touch sensitive surface. Thus, the computer may maintain a notion of persistence, which is that once a touchpoint has been associated with a controllable feature, the computer will assume that a touchpoint in the same general area is also associated with the controllable feature. Although this will require the user to use different portions of the touchpad for different controllable features, it allows the user to continue control over the controllable feature without re-designating the touchpoint whenever contact with the touchpad is lost.

Figure 5:
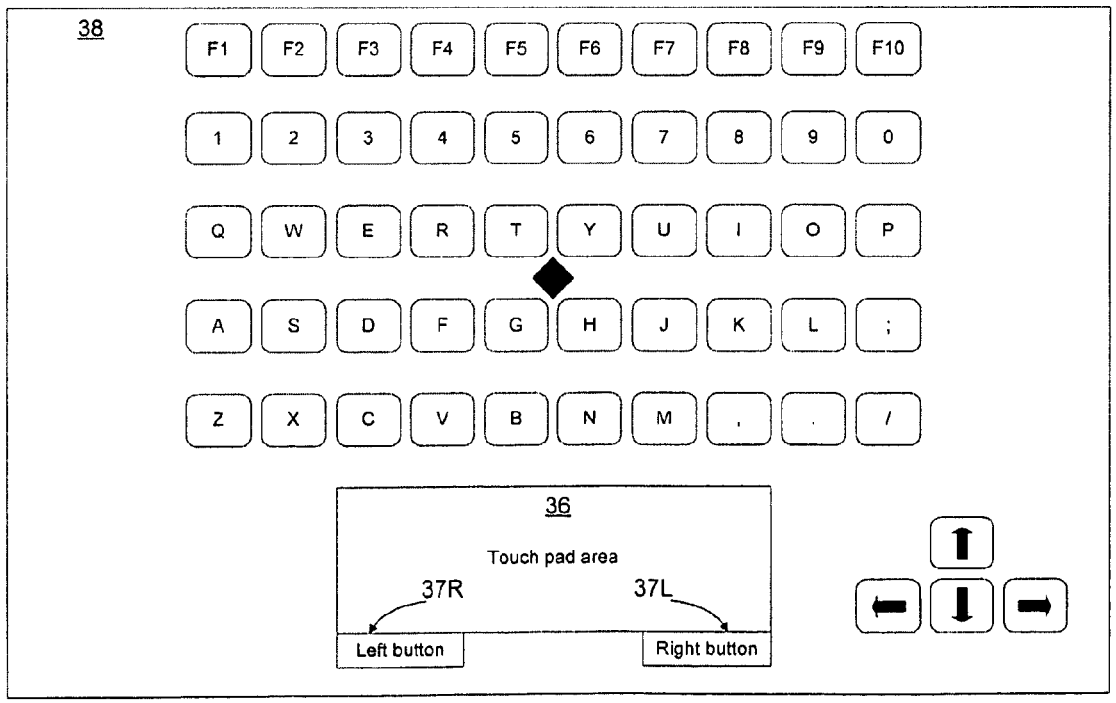
FIG. 5 is a functional block diagram of an example keyboard including a touch pad that may be used to control an Avatar in a three dimensional computer-generated virtual environment.

FIG. 5 shows a keyboard 38 that may be used in connection with an embodiment of the invention. The keyboard has been shown as having a plurality of keys which generally correspond to a standard QWERTY keyboard. Many different key combinations and computer keyboards have been created, and the invention is not limited to any particular key layout or type of keyboard. Thus, the keyboard may have fewer keys or additional keys, and the term keyboard is not to be construed as limited to a keyboard having only the illustrated keys or to having keys in this particular arrangement.

In the embodiment shown in FIG. 5, the keyboard has a touchpad area that is able to be used to control controllable features of an Avatar. For example, the keyboard may include the touchpad 36 such as the touchpad shown in FIG. 4. The user may use the touch pad to control motion of the Avatar. Optionally, the keys of the keyboard may be used to select the limb and the touch pad may be used to control the motion of the selected limb.

Where the computer has a touch sensitive display, a portion of the display may be designated for controlling the Avatar in a manner similar to that described above in connection with the touch pad. Additionally, the touch screen could be used directly to control the Avatar's actions such as by enabling the user to touch the Avatar's hand to cause the Avatar to raise its hand.

Optionally, when the user is controlling a particular feature of the Avatar using the touch-pad or touch sensitive display, a dot or other visual feedback may appear on the particular limb being controlled to provide additional visual feedback as to what aspect is being controlled. For example, a dot, aura, or other indication may be shown on the Avatar's foot when the user touches the touchpad to show the user that the user is controlling the Avatar's foot. If the use is not intending to control the Avatar's foot the user may take their finger off the touchpad and retouch a different portion of the touchpad or otherwise provide with input to select a different limb.

The functions described above may be implemented as one or more sets of program instructions that are stored in a computer readable memory within the network element(s) and executed on one or more processors within the network element(s). However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of enabling enhanced control over an Avatar in a three dimensional computer-generated virtual environment, the method comprising the steps of:
implementing an Avatar using skeletal animation in which the Avatar has a skeleton defined by Avars;
during execution of the three dimensional computer-generated virtual environment, receiving input from a user to select an Action to be performed by the Avatar in the three dimensional computer-generated virtual environment, the Action being implemented as a computer graphics animation sequence of the Avatar in the three dimensional computer-generated virtual environment in which motion of the Avatar during the Action is defined by specifying a pre-defined sequence of keyframes of the Avars during the computer graphics animation sequence, the input from the user specifying that the sequence of keyframes be executed to cause the Avatar to move through the pre-defined sequence of keyframes to complete the Action in the three dimensional computer-generated virtual environment;
after initializing execution of the pre-defined sequence of key frames, and prior to completion of execution of the pre-defined sequence of keyframes, receiving input from the user via a touch sensitive user input device to select one of the plurality of keyframes of the pre-defined sequence of keyframes to control an extent of completion of execution of the computer graphics animation sequence of the Action; and
translating the input from the user via the touch sensitive user input device into direct control over the extent of completion of execution of the computer graphics animation sequence of the Action.

2. The method of claim 1, wherein the touch sensitive user input device is a touchpad.

3. The method of claim 1, wherein the touch sensitive user input device is a touch sensitive display.

4. The method of claim 1, wherein the touch sensitive user input enables partial execution of the computer graphics animation sequence.

5. The method of claim 4, wherein the input via the touch sensitive user input device may be used to selectively move to subsequent or previous keyframes in the computer graphics animation sequence to enable the user to control the Avatar's movement within the computer graphics animation sequence, the step of selecting previous keyframes causes the animation sequence to move in the opposite direction as the specified sequence of keyframes specified in the computer graphics animation sequence of the Action.

6. The method of claim 1, wherein the Avatar is implemented using skeletal animation in which the Avatar has a skeleton defined by Avars, and in which the input from the touch sensitive user input device is used to directly control a specific selected one of the Avars.

7. The method of claim 6, wherein the direct control of the Avar enables the user to control the position and orientation of the Avar so that the user may cause the Avatar to move without requiring the Avatar to move through a predefined sequence of keyframes.

8. The method of claim 1, wherein the step of receiving input via a touch sensitive user input device enables the user to control the Avatar's legs within the virtual environment to control a walking motion of the Avatar within the virtual environment.

9. The method of claim 1, wherein computer graphics animation sequence associated with the Action causes multiple body parts of the Avatar to move, the method further comprising the step of receiving second input from another user input device to select one of the multiple body parts to be controlled by the input from the touch sensitive user input device.

10. A non-transitory tangible computer readable storage medium having stored thereon a computer program for implementing a virtual environment, the computer program comprising a set of instructions which, when executed by a computer, cause the computer to perform a method comprising the steps of:

implementing an Avatar using skeletal animation in which the Avatar has a skeleton defined by Avars;

during execution of the three dimensional computer-generated virtual environment, receiving input from a user to select an Action to be performed by the Avatar in the three dimensional computer-generated virtual environment, the Action being implemented as a computer graphics animation sequence of the Avatar in the three dimensional computer-generated virtual environment in which motion of the Avatar during the Action is defined by specifying a pre-defined sequence of keyframes of the Avars during the computer graphics animation sequence, the input from the user specifying that the sequence of keyframes be executed to cause the Avatar to move through the pre-defined sequence of keyframes to complete the Action in the three dimensional computer-generated virtual environment;

after initializing execution of the pre-defined sequence of key frames, and prior to completion of execution of the pre-defined sequence of keyframes, receiving input from the user via a touch sensitive user input device to select one of the plurality of keyframes of the defined sequence of keyframes to control an extent of completion of execution of the computer graphics animation sequence of the Action; and translating the input from the user via the touch sensitive user input device into direct control over the extent of completion of execution of the computer graphics animation sequence of the Action.

11. The computer program of claim 10, wherein the user input from the touch sensitive user input device may be used to control a speed with which the computer program executes a particular one of the computer animation sequence of the Avatar.

12. The method of claim 10, wherein each computer animation sequence specifies a series of keyframes, and wherein the user input from the touch sensitive user input device enables the user to select one of the keyframes within the computer animation sequence where the computer program should pause execution of the computer animation sequence.

13. The method of claim 12, wherein the user input from the touch sensitive user input device enables the user to change which of the keyframes should be selected, to enable the user to selectively cause execution of the computer animation sequence to move forward or backward along the series of keyframes.

* * * * *